(12) United States Patent
Fliearman et al.

(10) Patent No.: US 10,619,711 B2
(45) Date of Patent: Apr. 14, 2020

(54) INFINITELY VARIABLE TRANSMISSION WITH POWER REVERSER

(71) Applicant: Deere & Company, Moline, IL (US)

(72) Inventors: Steven R. Fliearman, Coffeyville, KS (US); Kyle K. McKinzie, Altamont, KS (US); Clayton G. Janasek, Independence, KS (US); Alec B. Hendryx, Coffeyville, KS (US); Reginald M. Bindl, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 55 days.

(21) Appl. No.: 15/485,911

(22) Filed: Apr. 12, 2017

(65) Prior Publication Data

US 2018/0298993 A1    Oct. 18, 2018

(51) Int. Cl.
*F16H 3/72* (2006.01)
*B60K 6/387* (2007.10)
(Continued)

(52) U.S. Cl.
CPC ............. *F16H 3/728* (2013.01); *B60K 6/387* (2013.01); *B60K 6/445* (2013.01); *B60K 6/54* (2013.01);
(Continued)

(58) Field of Classification Search
None
See application file for complete search history.

(56) References Cited

U.S. PATENT DOCUMENTS

| 3,214,987 A | 11/1965 | Schenck et al. |
| 3,626,787 A | 12/1971 | Singer |

(Continued)

FOREIGN PATENT DOCUMENTS

| CN | 101255907 A | 9/2008 |
| CN | 102844588 A | 12/2012 |

(Continued)

OTHER PUBLICATIONS

German Search Report for application No. 10 2018 203 670.5 dated Dec. 20, 2018.

(Continued)

*Primary Examiner* — Derek D Knight
(74) *Attorney, Agent, or Firm* — Klintworth & Rozenblat IP LLP (57) ABSTRACT

An infinitely variable transmission (IVT) for a work vehicle includes a variator with a first transmission component configured to receive engine power from an engine, a second transmission component configured to receive IVP power from an IVP machine, and an output transmission component configured to output summed engine power and IVP power. The IVT also includes a power reverser that connects the engine to the first transmission component of the variator and that transfers engine power to the first transmission component. The power reverser has a forward mode and a reverse mode. The power reverser, in the forward mode, is configured to rotate the first transmission component in a forward direction. The power reverser, in the reverse mode, is configured to rotate the first transmission component in a reverse direction.

18 Claims, 3 Drawing Sheets

(51) Int. Cl.
  *B60K 6/445* (2007.10)
  *B60K 6/38* (2007.10)
  *B60K 6/54* (2007.10)

(52) U.S. Cl.
  CPC .... *B60K 2006/381* (2013.01); *B60W 2300/15* (2013.01); *B60Y 2200/221* (2013.01); *F16H 2200/2005* (2013.01); *F16H 2200/2035* (2013.01)

(56) References Cited

U.S. PATENT DOCUMENTS

| | | | |
|---|---|---|---|
| 3,651,904 | A | 3/1972 | Snoy |
| 3,714,845 | A | 2/1973 | Mooney |
| 3,783,711 | A | 1/1974 | Orshansky, Jr. |
| 4,090,414 | A | 5/1978 | White |
| 4,164,155 | A | 8/1979 | Reed et al. |
| 4,164,156 | A | 8/1979 | Reed |
| 5,353,662 | A | 10/1994 | Vaughters |
| 5,508,574 | A | 4/1996 | Vlock |
| 5,931,757 | A | 8/1999 | Schmidt |
| 6,478,705 | B1 | 11/2002 | Holmes et al. |
| 6,684,148 | B2 | 1/2004 | Chess |
| 7,008,342 | B2 | 3/2006 | Dyck et al. |
| 7,252,611 | B2 | 8/2007 | Raghavan et al. |
| 7,294,079 | B2 | 11/2007 | Raghavan et al. |
| 7,311,627 | B2 | 12/2007 | Tarasinski |
| 7,329,201 | B2 | 2/2008 | Raghavan et al. |
| 7,367,911 | B2 | 5/2008 | Raghavan et al. |
| 7,377,876 | B2 | 5/2008 | Yang |
| 7,399,246 | B2 | 7/2008 | Holmes et al. |
| 7,465,251 | B2 | 12/2008 | Zhang |
| 7,473,201 | B2 | 1/2009 | Raghavan et al. |
| 7,479,081 | B2 | 1/2009 | Holmes |
| 7,491,144 | B2 | 2/2009 | Conlon |
| 7,901,314 | B2 | 3/2011 | Salvaire et al. |
| 7,942,776 | B2 | 5/2011 | Conlon |
| 8,234,956 | B2 | 8/2012 | Love et al. |
| 8,257,213 | B2 | 9/2012 | Komada et al. |
| 8,469,127 | B2 | 6/2013 | Tarasinski et al. |
| 8,500,585 | B2 | 8/2013 | Kim et al. |
| 8,573,340 | B2 | 11/2013 | Tarasinski et al. |
| 8,579,751 | B2 | 11/2013 | Phillips |
| 8,596,157 | B2 | 12/2013 | Vu |
| 8,660,724 | B2 | 2/2014 | Tarasinski et al. |
| 8,734,281 | B2 | 5/2014 | Ai et al. |
| 8,747,266 | B2 | 6/2014 | Aitzetmueller et al. |
| 8,784,246 | B2 | 7/2014 | Treichel et al. |
| 8,790,202 | B2 | 7/2014 | Sakai et al. |
| 8,944,194 | B2 | 2/2015 | Glaser et al. |
| 8,986,162 | B2 | 3/2015 | Dix et al. |
| 9,002,560 | B2 | 4/2015 | Hasegawa |
| 9,206,885 | B2 * | 12/2015 | Rekow ..................... F16H 3/72 |
| 9,487,073 | B2 | 11/2016 | Love et al. |
| 9,562,592 | B2 | 2/2017 | Rekow et al. |
| 9,944,163 | B2 | 4/2018 | McKinzie |
| 9,981,665 | B2 | 5/2018 | Rekow et al. |
| 10,119,598 | B2 | 11/2018 | Rekow et al. |
| 2003/0186769 | A1 | 10/2003 | Al et al. |
| 2004/0094381 | A1 | 5/2004 | Versteyhe |
| 2005/0049100 | A1 | 3/2005 | Al et al. |
| 2006/0046886 | A1 | 3/2006 | Holmes et al. |
| 2006/0111212 | A9 | 5/2006 | Ai et al. |
| 2006/0142104 | A1 | 6/2006 | Saller |
| 2006/0276291 | A1 | 12/2006 | Fabry et al. |
| 2007/0021256 | A1 | 1/2007 | Klemen et al. |
| 2007/0021257 | A1 | 1/2007 | Klemen et al. |
| 2007/0249455 | A1 | 10/2007 | Hasegawa et al. |
| 2010/0048338 | A1 | 2/2010 | Si |
| 2010/0179009 | A1 | 7/2010 | Wittkopp et al. |
| 2010/0261565 | A1 | 10/2010 | Ai et al. |
| 2011/0130235 | A1 | 6/2011 | Phillips |
| 2012/0157254 | A1 | 6/2012 | Aitzetmueller et al. |
| 2013/0023370 | A1 | 1/2013 | Grad et al. |
| 2014/0018201 | A1 | 1/2014 | Tolksdorf |
| 2014/0128196 | A1 | 5/2014 | Rintoo |
| 2015/0006007 | A1 | 1/2015 | Kitahata et al. |
| 2015/0072823 | A1 | 3/2015 | Rintoo |
| 2015/0142232 | A1 | 5/2015 | Tabata et al. |
| 2015/0183436 | A1 | 7/2015 | Rekow et al. |
| 2015/0184726 | A1 | 7/2015 | Rekow et al. |
| 2015/0292608 | A1 | 10/2015 | McKinzie |
| 2016/0090091 | A1 | 3/2016 | Gugel et al. |
| 2016/0201295 | A1 | 7/2016 | Kishimoto et al. |
| 2016/0272059 | A1 | 9/2016 | Watanabe et al. |
| 2017/0102059 | A1 | 4/2017 | Rekow et al. |
| 2017/0284508 | A1 | 10/2017 | Devreese |
| 2017/0284517 | A1 | 10/2017 | Rekow et al. |
| 2017/0328453 | A1 | 11/2017 | McKinzie et al. |
| 2018/0043764 | A1 | 2/2018 | McKinzie et al. |
| 2018/0149247 | A1 | 5/2018 | Rekow et al. |

FOREIGN PATENT DOCUMENTS

| | | |
|---|---|---|
| DE | 1173348 B | 7/1964 |
| DE | 4010919 A1 | 10/1991 |
| DE | 19621200 A1 | 11/1997 |
| DE | 19954636 A1 | 5/2001 |
| DE | 10128076 A1 | 12/2002 |
| DE | 102006041160 A1 | 9/2008 |
| DE | 202009007972 U1 | 6/2010 |
| DE | 11545 U1 | 12/2010 |
| DE | 102010021846 A1 | 12/2011 |
| DE | 10201102210 A1 | 7/2012 |
| DE | 102011102184 A1 | 7/2012 |
| DE | 10201105868 A1 | 1/2013 |
| DE | 102011115002 A1 | 4/2013 |
| DE | 102013220167 A1 | 4/2015 |
| DE | 19214225298 U1 | 7/2015 |
| DE | 102015200973 A1 | 7/2016 |
| DE | 102016120965 A1 | 5/2017 |
| DE | 112006002537 A1 | 5/2017 |
| DE | 102016204727 A1 | 9/2017 |
| DE | 102018108510 A1 | 10/2018 |
| DE | 202015102282 A1 | 10/2018 |
| EP | 00805059 A2 | 5/1997 |
| EP | 1099882 A2 | 5/2001 |
| EP | 1707416 B1 | 8/2007 |
| EP | 2466168 A1 | 6/2012 |
| EP | 2466169 A1 | 6/2012 |
| WO | 2011092643 A1 | 8/2011 |
| WO | 2012171812 A1 | 12/2012 |

OTHER PUBLICATIONS

German Search Report for application No. 102019205211 dated Sep. 5, 2019.

Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.

John M. Miller, Hybrid Electric Vehicle Propulsion System Architectures of the e-CVT Type, IEEE Transactions on Power Electronics, vol. 21, No. 3, May 2006.

Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.

Deere & Company, U.S. Appl. No. 15/879,796, filed Jan. 25, 2018.
Deere & Company, U.S. Appl. No. 15/971,867, filed May 4, 2018.
Deere & Company, U.S. Appl. No. 15/977,242, filed May 11, 2018.
Deere & Company, U.S. Appl. No. 16/371,598, filed Apr. 1, 2019.
German Search Report for application No. 10215206174 dated Jul. 16, 2015.
German Search Report for application No. 102018210616 dated Feb. 1, 2019.
German Search Report for application No. 1020182099391 dated Feb. 27, 2019.
German Search Report for application No. 1020182099405 dated Feb. 28, 2019.

(56) References Cited

OTHER PUBLICATIONS

German Search Report for application No. 102018212712 dated Apr. 12, 2019.
USPTO Office Action in U.S. Appl. No. 14/536,097 dated Sep. 25, 2017.
USPTO Office Action in U.S. Appl. No. 14/249,258 dated Apr. 21, 2017.
USPTO Office Action in U.S. Appl. No. 14/249,258 dated Aug. 22, 2017.
USPTO Office Action in U.S. Appl. No. 14/249,258 dated Oct. 17, 2016.
USPTO Office Action in U.S. Appl. No. 15/879,796 dated Aug. 23, 2019.
USPTO Office Action in U.S. Appl. No. 15/793,522 dated Apr. 18, 2019.
CNIPA Office Action dated Aug. 9, 2018 for Application No. 201510165982.4, Serial Notice No. 2018080601675890.
USPTO, Office Action in U.S. Appl. No. 15/664,289 dated Jul. 26, 2018.
USPTO, Office Action in U.S. Appl. No. 15/664,289 dated Dec. 13, 2018.
USPTO, Non-Final Office Action issued in pending U.S. Appl. No. 15/971,867 dated Dec. 12, 2019.
USPTO, Non-Final Office Action issued in pending U.S. Appl. No. 15/628,979 dated Nov. 5, 2019.
German Search Report fer application No. 102019204706.8 dated Dec. 17, 2019.

* cited by examiner

INFINITELY VARIABLE TRANSMISSION WITH POWER REVERSER

CROSS-REFERENCE TO RELATED APPLICATIONS

Not applicable.

STATEMENT OF FEDERALLY SPONSORED RESEARCH OR DEVELOPMENT

Not applicable.

FIELD OF THE DISCLOSURE

This disclosure relates to transmissions for work vehicles, and more particularly, to infinitely variable transmissions.

BACKGROUND OF THE DISCLOSURE

It may be useful, in a variety of settings, to utilize both a traditional engine (e.g., an internal combustion engine) and an infinitely variable power source (e.g., an electric or hydrostatic motor, a variable chain drive, and so on) to provide useful power. For example, a portion of engine power may be diverted to drive a first infinitely variable machine (e.g., a first electric machine acting as a generator), which may in turn drive a second infinitely variable machine (e.g., a second electric machine acting as a motor using electrical power from the first electrical machine). In certain configurations, power from both types of sources (i.e., an engine and an infinitely variable power source) may be combined for final power delivery (e.g., to a vehicle axle) via a continuously or infinitely variable transmission ("IVT"). This may be referred to as "split-mode" or "split-path mode" operation because power transmission may be split between the mechanical path from the engine and the infinitely variable path.

Split-mode operation may be attained in various known ways. For example, a planetary gear set may be utilized to sum rotational power from an engine and from an electric machine, with the summed power transmitted downstream within an associated powertrain. This may allow for delivery of power (e.g., to vehicle wheels) with an infinitely variable effective gear ratio.

Various issues may arise, however, including limitations relating to the maximum practical speed of the variable power sources, fuel efficiency, etc. Also, these IVTs may be relatively complex. They may include a large number of parts. As such, it may take a large amount of time to manufacture and assemble the IVT. Moreover, the IVT may be very bulky and may take up a significant amount of room within the vehicle. Likewise, the IVT may contribute significantly to the overall weight of the vehicle, which can negatively affect fuel efficiency.

SUMMARY OF THE DISCLOSURE

In one aspect, the disclosure provides an infinitely variable transmission (IVT) for a work vehicle that includes an engine and an infinitely variable power (IVP) machine. The IVT includes a variator with a first transmission component configured to receive engine power from the engine, a second transmission component configured to receive IVP power from the IVP machine, and an output transmission component configured to output summed engine power and IVP power. The IVT also includes a power reverser that connects the engine to the first transmission component of the variator and that transfers engine power from the engine to the first transmission component. The power reverser has a forward mode and a reverse mode. The power reverser, in the forward mode, is configured to rotate the first transmission component in a forward direction. The power reverser, in the reverse mode, is configured to rotate the first transmission component in a reverse direction.

In another aspect, a method of operating an infinitely variable transmission (IVT) of a work vehicle is disclosed. The method includes providing IVP power from an infinitely variable power (IVP) machine to a first transmission component of a variator. The method also includes providing engine power from an engine, through a power reverser, to a second transmission component of the variator. Furthermore, the method includes summing IVP power and engine power by an output transmission component of the variator. Moreover, the method includes changing the power reverser between a forward mode and a reverse mode. The power reverser, in the forward mode, rotates the second transmission component in a forward direction. The power reverser, in the reverse mode, is configured to rotate the second transmission component in a reverse direction.

In a further aspect, a work vehicle is disclosed that includes an engine with an engine gear, an electric machine, and a variator with a planetary gearset having a first gear, a second gear, and an output gear. The first gear is configured to receive engine power from the engine, the second gear is configured to receive e-power power from the electric machine, and the output gear is configured to output summed engine power and e-power. The work vehicle also includes a power reverser that connects the engine to the first gear of the planetary gearset and that transfers engine power from the engine to the first gear. The power reverser has a forward mode and a reverse mode. The power reverser, in the forward mode, is configured to rotate the first gear in a forward direction. The power reverser, in the reverse mode, is configured to rotate the first gear in a reverse direction.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed infinitely variable transmission (IVT) with a power reverser, as shown in the accompanying drawings described briefly above. Various modifications to the example embodiments may be contemplated by one of skill in the art.

For convenience of notation, the term "component" may be used herein, particularly in the context of a planetary gear set, to indicate an element for transmission of power. A planetary gear set may include, for example, a first component, a second component, and a third component. In some embodiments, the first component may comprise a sun gear, the second component may comprise a ring gear, and the third component may comprise one or more planet gears and an associated carrier.

In various known configurations, the IVT of the present disclosure may include one or more planetary gear sets that are configured to combine the power output of an engine and an infinitely variable power (IVP) source. In some embodiments, the engine may comprise an internal combustion engine (e.g., a diesel engine), and the IVP source may include an electric or hydraulic machine.

Also, a variator may be included that sums power from multiple power sources. For example, a planetary gear set may be included with a first component that receives power from the engine, a second component that receives power from the IVP source, and a third component that sums the power from the engine and the IVP source and that outputs the summed power to another device that is connected to the third component. It will be understood that such a configuration may allow for essentially infinite and continuous gear ratios for the planetary gear set. For example, for a fixed engine speed, a particular gear ratio may be set by varying the speed of the IVP with respect to the engine speed.

The disclosed IVT may further include a power reverser device. In a first mode (e.g., forward mode), the power reverser device may transfer power from one of the power sources and turn a component of the variator in a first direction (e.g., a forward direction). In a second mode (e.g., reverse mode), the power reverser device may transfer power from the power source and turn the component of the variator in a second direction (e.g., a reverse direction). Accordingly, in some embodiments, the IVT may provide infinite and continuous gear ratios in both modes of the power reverser. Also, as will be discussed, the power reverser may be relatively compact. The power reverser may have a relatively low part count. Furthermore, the weight of the power reverser can be quite low. Additionally, shifting between the different modes can be achieved in a fairly smooth and efficient fashion.

Moreover, the power reverser device may speed up the input from the power source in some embodiments. This speed-up may allow the input to more closely match another input to the variator. Additionally, the power reverser device may allow the summed output to be switched from forward to reverse and then input to a gearbox (i.e., a downstream transmission) without separate reverse gear elements. Furthermore, equal torque may be provided in both the forward mode and the reverse mode.

Figure 1:
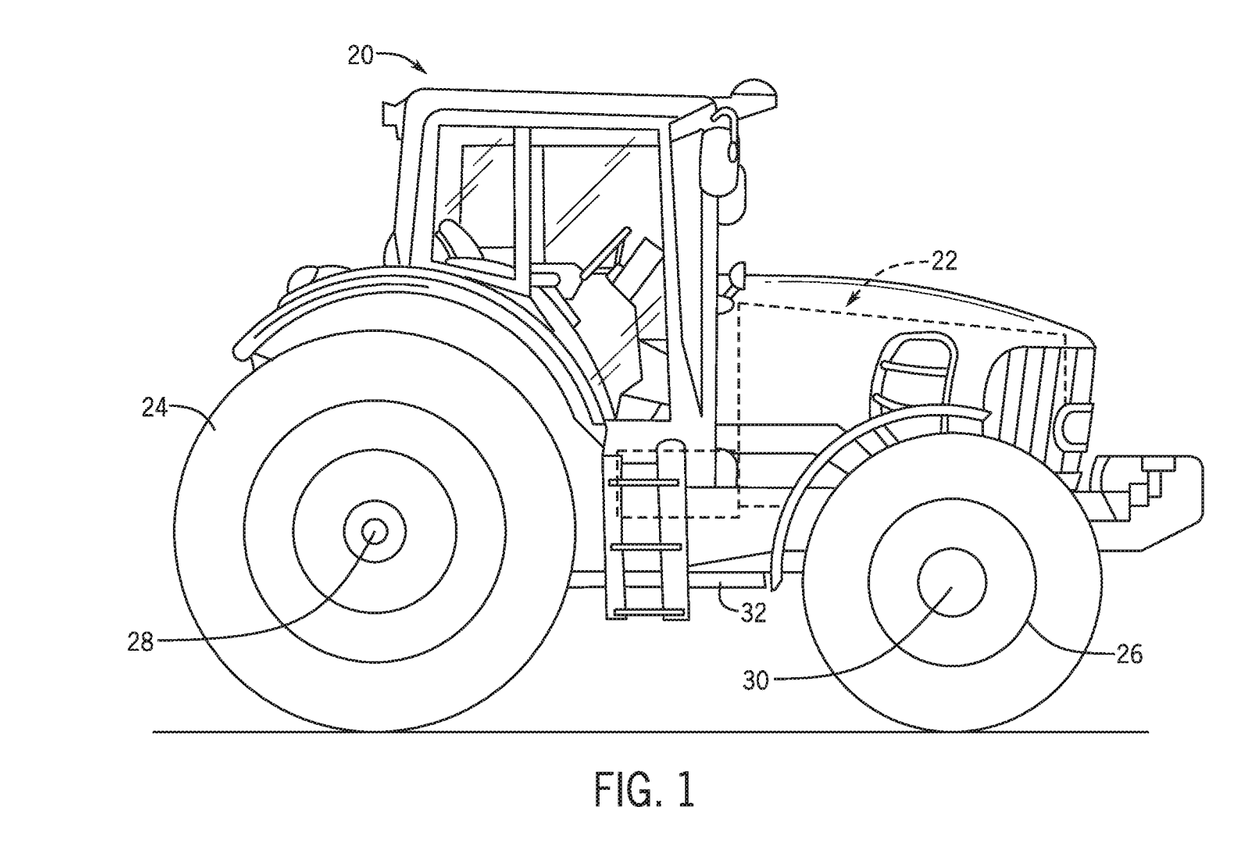
FIG. 1 is a side view of a work vehicle with an infinitely variable transmission (IVT) of the present disclosure.

As will become apparent from the discussion herein, an IVT may be used advantageously in a variety of settings and with a variety of machinery. For example, referring now to FIG. 1, an IVT may be included in a powertrain 22 of a work vehicle 20. The powertrain 22 is supported by a chassis 32 of the work vehicle 20. In FIG. 1, the work vehicle 20 is depicted as a tractor. It will be understood, however, that other configurations may be possible, including a configuration of the work vehicle 20 as a different kind of tractor, as a log skidder, as a grader, or as one of various other work vehicle types. It will further be understood that the disclosed IVT may also be used in non-work vehicles and non-vehicle applications (e.g., fixed-location powertrains).

The work vehicle 20 may include a plurality of rear wheels 24 and a plurality of front wheels 26. The rear wheels 24 may be connected by a rear axle 28. The front wheels 26 may be connected by a front axle 30. In some embodiments, the rear axle 28 receives power from the IVT to rotate the rear wheels 24. It will be appreciated that the work vehicle 20 may be configured such that the front axle 30 receives power from the IVT as well as (or instead of) the rear axle 28.

The disclosed IVT may allow operation of the work vehicle 20 in a forward direction (i.e., forward rotation of the wheels 24, 26) and in an opposite reverse direction (i.e., reverse rotation of the wheels 24, 26). In some embodiments, the IVT may provide infinite and a continuous gear ratios in both the forward mode and the reverse mode.

Figure 2:
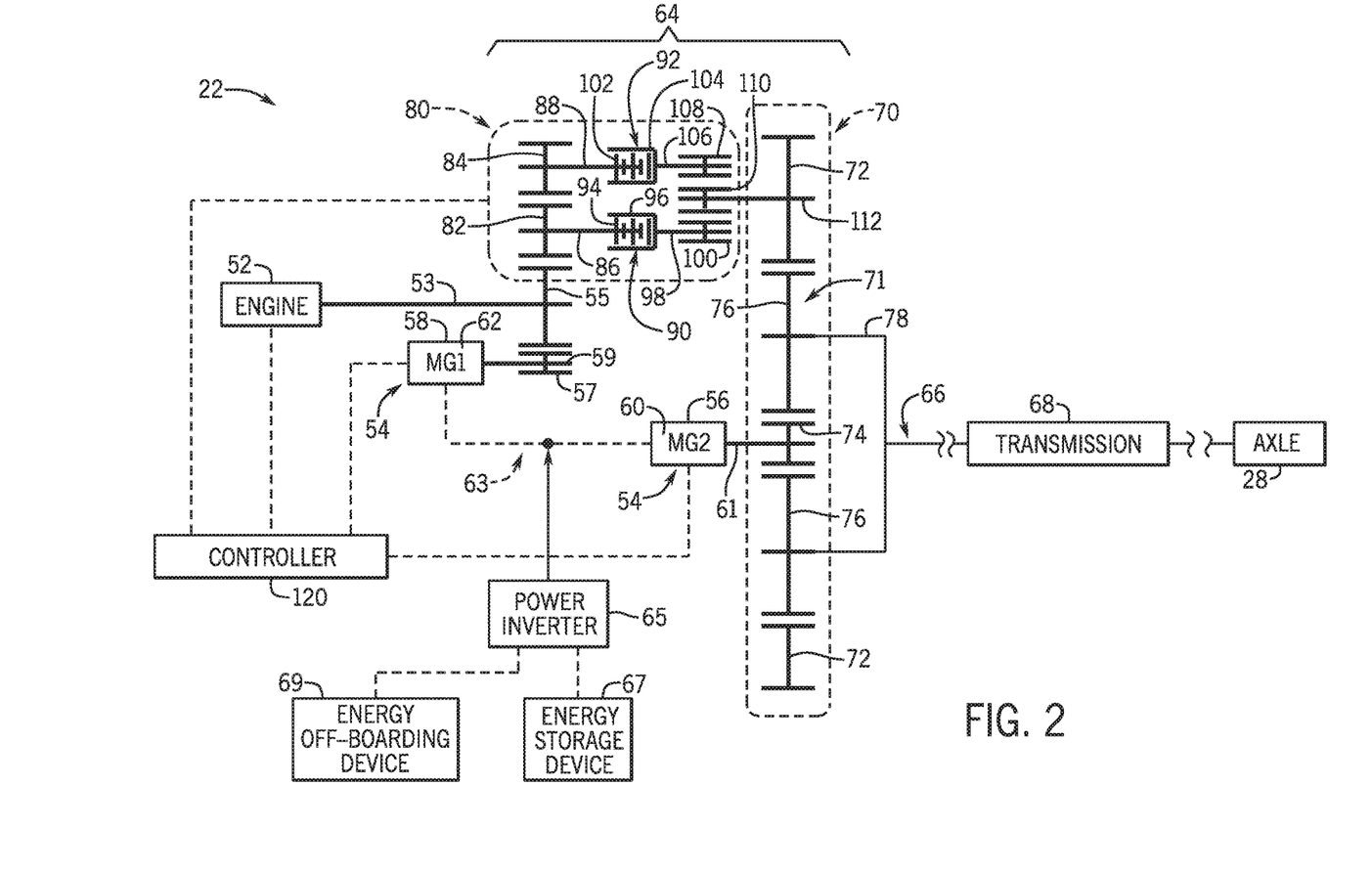
FIG. 2 is a schematic view of an example embodiment of the IVT of the work vehicle of FIG. 1.

Referring now to FIG. 2, the powertrain 22 is shown in greater detail according to example embodiments. As shown, an engine 52 may provide mechanical power into the powertrain 22. The engine 52 may be an internal combustion engine, such as a diesel engine, in some embodiments. The engine 52 may include an engine shaft 53, which the engine rotates to provide mechanical power into the powertrain 22. An input gear 55 may be fixed to the engine shaft 53 for rotation therewith. The input gear 55 may be a spur gear, a helical gear, a bevel gear, or other type.

Also, at least one IVP (infinitely variable power) machine 54 may be included for providing power to and/or for receiving power from the powertrain 22. In some embodiments, there may be multiple IVP machines 54, such as a first IVP machine 58 and a second IVP machine 56. The first IVP machine 58 may comprise a first electric machine 62, and the second IVP machine 56 may comprise a second electric machine 60. The first electric machine 62 may include a first e-machine shaft 59, and the second electric machine 60 may include a second e-machine shaft 61. A first e-machine gear 57 may be fixed to the shaft 59. In some embodiments, the first e-machine gear 57 may be a spur gear, a helical gear, or other type of gear, and the first e-machine gear 57 may be enmeshed with the input gear 55 of the engine 52.

In some embodiments, the second electric machine 60 may convert electrical power to mechanical power and input the mechanical power into the powertrain 22 (i.e., in a motor mode), and/or the second electric machine 60 may alternatively receive mechanical power from the powertrain 22 and convert the mechanical power to electrical power (i.e., in a generator mode). Likewise, in some embodiments, the first electric machine 62 may convert electrical power to mechanical power and input the mechanical power into the powertrain 22 (i.e., in a motor mode), and/or the first electric machine 62 may alternatively receive mechanical power from the powertrain 22 and convert the mechanical power to electrical power (i.e., in a generator mode). Furthermore, in some embodiments, the second electric machine 60 may be in the motor mode while the first electric machine 62 is in the generator mode and vice versa. The powertrain 22 may also include an electrical power line 63, which electrically connects the first and second electric machines 60, 62. Accordingly, one of the electric machine 60, 62 may provide electrical power to the other during operation. A power inverter 65 may be included and may be operably connected to the first electric machine 62 and/or the second electric machine 60. In some embodiments, the power inverter 65 may feed energy to and/or receive energy from an energy storage device 67. Also, the power inverter 65 may feed energy to and/or receive energy from the powertrain 22. Moreover, in some embodiments, the power inverter 65 may off-board power to an implement and/or another energy off-boarding device 69.

The powertrain 22 may also include an IVT 64. The IVT 64 may transmit power between the engine 52, the second electric machine 60, and the first electric machine 62. The IVT 64 may also provide power from the engine 52, second electric machine 60, and/or the first electric machine 62 to an output shaft 66. The output shaft 66 may provide output power to a downstream transmission 68 in some embodiments. The downstream transmission 68 may be of any suitable type for transmitting power from the output shaft 66 to an axle of the vehicle 20 (e.g., the rear axle 28). In some embodiments, the downstream transmission 68 may be an infinitely variable transmission that is distinct from the IVT 64. Also, the downstream transmission 68 may include a plurality of gears, shafts, and other components for transferring power to the axle 28. The downstream transmission 68 may also provide a predetermined gear ratio between the output shaft 66 and the axle 28. It will be appreciated that the downstream transmission 68 may be an optional component of the powertrain 22, and that in other embodiments, the output shaft 66 of the IVT 64 may provide power directly to the axle 28. Also, the IVT 64 may be a substantially distinct module that is operably disposed upstream from the transmission 68. Thus, it will be appreciated that the IVT 64 may be incorporated within the powertrain 22 in a convenient manner. Also, in some embodiments, the IVT 64 may be incorporated upstream of a conventional transmission 68 without having to substantially alter the downstream transmission 68. Thus, the IVT 64 may be used to alter an existing powertrain design, to retrofit an existing powertrain, etc.

The IVT 64 may include one or more geartrains and/or gearsets configured to provide different power flow paths to the rear axle 28. For example, in some embodiments, the IVT 64 may include a variator 70. In some embodiments, the variator 70 may comprise a planetary gearset 71 (e.g., a single planetary gearset) with a first component (e.g., a ring gear 72), a second component (e.g., a sun gear 74), and an output component (e.g., a plurality of planet gears 76 and an associated carrier 78). It will be appreciated that the planet gears 76 may be disposed between the ring gear 72 and the sun gear 74 and may be enmeshed with both. The planetary gearset 71 may have a variety of configurations, gear ratios, dimensions, etc. without departing from the scope of the present disclosure.

The IVT 64 may further include a power reverser 80. The power reverser 80 may include a first gear 82, which is fixed to a first shaft 86 for rotation therewith. The power reverser 80 may further include a second gear 84, which is fixed to a second shaft 88 for rotation therewith. The first gear 82 and the second gear 84 may be of any suitable type, such as a spur gear, a helical gear, a bevel gear, or other type. In the embodiment shown, the first gear 82 (and the first shaft 86) rotate about an axis that is substantially parallel to the axis of rotation of the second gear 84 (and the second 88). Also, in some embodiments, the first gear 82 and the second gear 84 may be enmeshed with each other. Accordingly, the first gear 82 and second gear 84 may rotate simultaneously in opposite directions. The first gear 82 and the second gear 84 may be continuously enmeshed, meaning that the first gear 82 and second gear 84 remain enmeshed in the different modes of the power reverser 80 (i.e., there is no mode in which the first and second gear 82, 84 disengage).

The power reverser 80 may further include a first clutch 90. The first clutch 90 may include a plurality of first clutch members 94 (e.g., friction plates, clutch plates, etc.) that are fixed to the first shaft 86 for rotation therewith. The first clutch 90 may also include a plurality of second clutch members 96 (e.g., friction plates, clutch plates, etc.) that are fixed to a first intermediate shaft 98 for rotation therewith. A first intermediate gear 100 may be fixed to the first intermediate shaft 98 for rotation therewith as well. The first clutch 90 may have an engaged position (i.e., clutched position, activated position) in which the first and second clutch members 94, 96 are engaged and fixed together for co-rotation. This causes the first gear 82 and the first intermediate gear 100 to be rotationally coupled for rotation as a unit. The first clutch 90 may additionally have a disengaged position (i.e., unclutched position, deactivated position), in which the first and second clutch members 94, 96 are disengaged. This allows the first gear 82 and the first intermediate gear 100 to release, decouple, and allow for relative rotation.

The power reverser 80 may further include a second clutch 92. The second clutch 92 may include a plurality of first clutch members 102 (e.g., friction plates, clutch plates, etc.) that are fixed to the second shaft 88 for rotation therewith. The second clutch 92 may also include a plurality of second clutch members 104 (e.g., friction plates, clutch plates, etc.) that are fixed to a second intermediate shaft 106 for rotation therewith. A second intermediate gear 108 may be fixed to the second intermediate shaft 106 for rotation therewith as well. Like the first clutch 90, the second clutch 92 may have an engaged position and a disengaged position. In the engaged position of the second clutch 92, the second gear 84 and the second intermediate gear 108 may be rotationally coupled for rotation as a unit. Conversely, in the disengaged position, the second gear 84 and the second intermediate gear 108 may be de-coupled for relative rotation with respect to each other.

Furthermore, the power reverser 80 may include a common gear 110. The common gear 110 may be enmeshed with the first intermediate gear 100. Additionally, the common gear 110 may be enmeshed with the second intermediate gear 108. The common gear 110 may be continuously enmeshed with the first intermediate gear 100 and the second intermediate gear 108. Accordingly, the common gear 110 may be disposed between the first and second intermediate gears 100, 108.

The power reverser 80 may be operably coupled to other components of the IVT 64 in various ways. Generally, the power reverser 80 may connect the engine 52 (and the first electric machine 62) to the variator 70. Accordingly, the power reverser 80 may transfer power from the engine 52 (and, in some embodiments, the first electric machine 62) to the variator 70.

For example, the first gear 82 of the power reverser 80 may be enmeshed with the input gear 55 of the engine 52. The first gear 82 may be continuously enmeshed with the input gear 55 in some embodiments. It is noted that the second gear 84 may be spaced apart from the input gear 55. In other words, the first gear 82 may be disposed between the input gear 55 and the second gear 84. Accordingly, the input gear 55, the first gear 82, and the second gear 84 may rotate simultaneously with the first gear 82 rotating in a direction that is opposite that of the input gear 55 and the second gear 84. Also, in some embodiments, the input gear 55, the first gear 82 and the second gear 84 each rotate about substantially parallel axes.

The common gear 110 of the power reverser 80 may be connected to the variator 70. For example, a common input member 112 may support the common gear 110 and may be rotationally connected to the ring gear 72 of the variator 70. (It will be appreciated that the attachment of the common input member 112 to the ring gear 72 is shown schematically in FIG. 2.) As such, the common input member 112 may provide power (from the engine 52 and/or the first electric machine 62) to the ring gear 72 of the variator 70.

Additionally, the second e-machine shaft 61 of the second electric machine 60 may be operably connected to the sun gear 74 of the variator 70. Thus, the second e-machine shaft 61 may provide power (from the second electric machine 60) to the sun gear 74 of the variator 70.

During operation, the variator 70 may sum: 1) power of the engine 52 (and possibly the first electric machine 62) delivered via the power reverser 80; and 2) power of the second electric machine 60. Specifically, the planet gears 76 and the associated carrier 78 of the variator 70 may be configured to sum the power of the ring gear 72 and the sun gear 74 and deliver the summed power to the transmission 68 and, ultimately, to the axle 28.

It will be appreciated that the IVT 64 may be configured differently without departing from the scope of the present disclosure. For example, in other embodiments, the power reverser 80 may be operably connected to the sun gear 74, the second electric machine 60 may be operably connected to the ring gear 72, and the planet gears 76 and associated carrier 78 may provide summed power to the transmission 68 and, ultimately, the axle 28.

The powertrain 22 may additionally include a controller 120. In some embodiments, the controller 120 may be in communication with the engine 52, the second electric machine 60, and the first electric machine 62 for controlling the power output of each. Also, the controller 120 may be in communication with the power reverser 80. Specifically, the controller 120 may provide control signals to the first clutch 90 for controlling whether the first clutch 90 is in the engaged position or the disengaged position. Likewise, the controller 120 may provide control signals to the second clutch 92 for controlling whether the second clutch 92 is in the engaged position or the disengaged position. In some embodiments, the controller 120 controls the first and second clutches 90, 92 such that while one clutch 90, 92 is engaged, the other is disengaged. Also, when one of the clutches 90, 92 is switched from its engaged position to its disengaged position, the other is switched from its disengaged position to its engaged position. Thus, the controller 120 may control the clutches 90, 92 to simultaneously alternate between the respective engaged and disengaged positions.

It will be appreciated that the controller 120 may be of any suitable type, such as an electric controller, a hydraulic controller, or otherwise. Also, the controller 120 may include one or more associated actuators, for example, for actuating the clutches 90, 92 between the respective engaged and disengaged positions. Also, the controller 120 may receive various inputs from various sensors or devices (not shown) via a CAN bus (not shown) of the vehicle 20 for providing effective controls.

During operation of the powertrain 22, the engine 52 may provide power to rotate the input gear 55. This power may be partially supplied to the first electric machine 62, such that the first electric machine 62 generates electric power. Power from the engine 52 may also be supplied to the power reverser 80, which may transmit power to the ring gear 72 of the variator 70. In some embodiments, the gear ratios through these components may cause rotational speed-up along the path from the engine 52 to the first electric machine 62. Likewise, the gear ratios may cause rotational speed-up along the path from the engine 52, through the power reverser 80, to the ring gear 72. Furthermore, the second electric machine 60 may input power to the sun gear 74 of the variator 70. The variator 70 may sum the power at the planet gears 76, and the summed power may be output to the downstream transmission 68, and ultimately the axle 28.

Moreover, the power reverser 80 may have a first (forward) mode for driving the ring gear 72 in rotation in a first (forward) direction. The power reverser 80 may also have a second (reverse) mode for driving the ring gear 72 in rotation in a second (reverse) direction.

In the first mode, the first clutch 90 may be engaged while the second clutch 92 is disengaged. This allows power from the input gear 55 to transfer to the first gear 82, through the first clutch 90, to the first intermediate gear 100, to the common gear 110, for rotating the ring gear 72 in the first (forward) direction.

Conversely, in the second mode, the second clutch 92 may be engaged while the first clutch 90 is disengaged. This allows power from the input gear 55 to transfer to the first gear 82, to the second gear 84, through the second clutch 92, to the second intermediate gear 108, to the common gear 110, for rotating the ring gear 72 in the second (reverse) direction.

The second electric machine 60 may be operated according to the setting of the power reverser 80. Thus, the second electric machine 60 may rotate the sun gear 74 in a first (forward) direction when the power reverser is in the first (forward) mode. As such, the variator 70 may sum the power as discussed above, and this summed power may ultimately move the vehicle 20 forward. Conversely, the second electric machine 60 may rotate the sun gear 74 in a second (reverse) direction when the power reverser is in the second (reverse) mode. As such, the variator 70 may sum the power as discussed above, and this summed power may ultimately move the vehicle 20 in reverse.

Accordingly, it will be appreciated that the power reverser 80 and, thus, the IVT 64 may be substantially compact and, yet, effective for providing split-path forward and reverse modes. The part count of the IVT 64 may be relatively low, allowing manufacturing and assembly of the IVT 64 to be accomplished in a relatively short amount of time. Also, shifting between the different modes may be accomplished in a smooth and efficient fashion.

Moreover, the power reverser 80 may speed up the input from the engine 52, and this speed-up may allow the input to more closely match input from the second electric machine 60. Additionally, the power reverser 80 may allow the summed output to be switched from forward to reverse and then input to the downstream transmission 68 without separate reverse gear elements. Furthermore, equal torque may be provided to the axle 28 in both the forward mode and the reverse mode.

Figure 3:
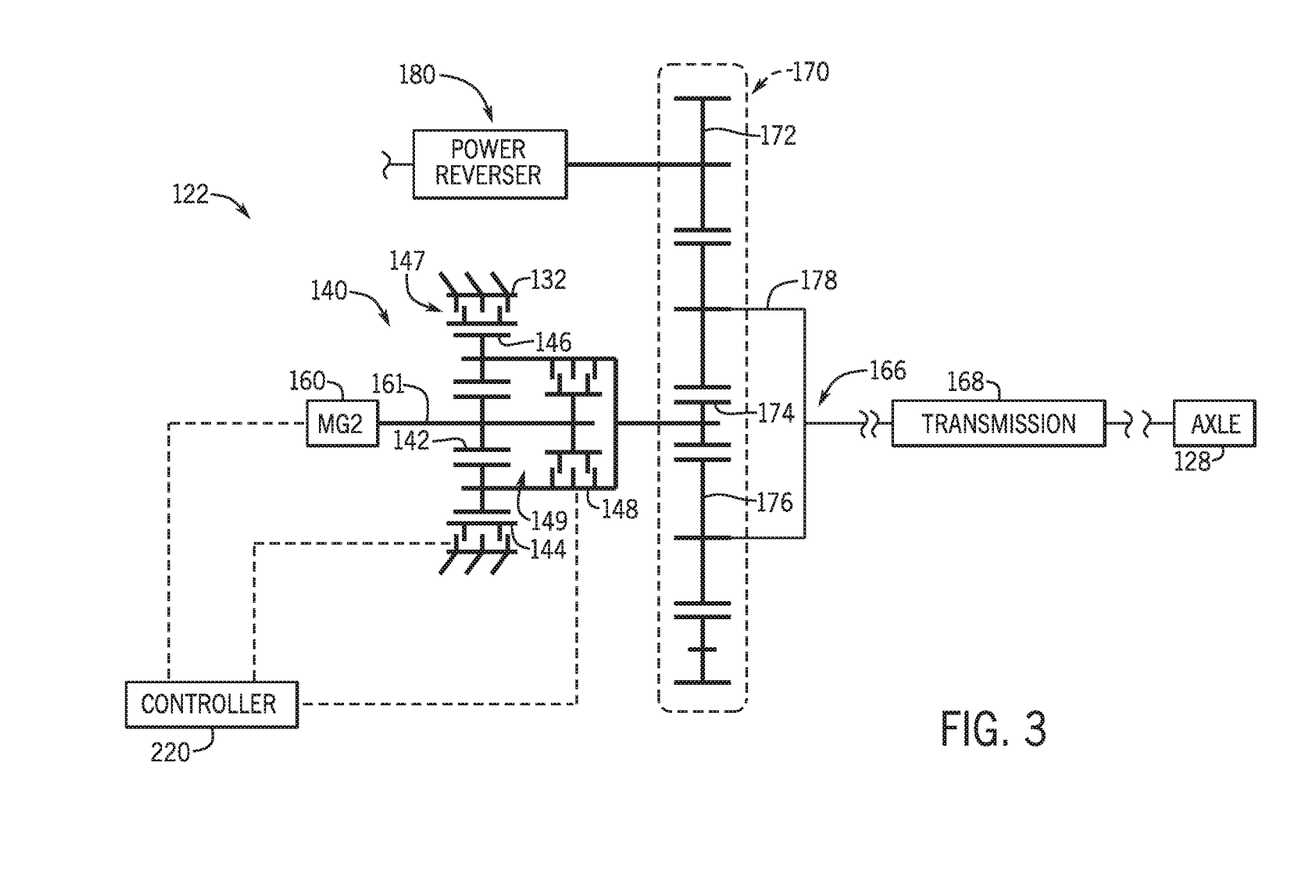
FIG. 3 is a schematic view of the IVT of the present disclosure according to an additional embodiment.

Referring now to FIG. 3, additional embodiments of the powertrain 122 are illustrated. The powertrain 122 may include several features discussed above with respect to the powertrain 22 of FIG. 2. The detailed description of those components will not be repeated for brevity. Features that correspond to those of FIG. 2 are indicated with corresponding reference numbers increased by 100.

The power reverser 180 may be substantially similar to the embodiments discussed above. Although they are not shown, it will be appreciated that the power reverser 180 may receive power from an engine and/or an electric machine, similar to the embodiments discussed above. The power reverser 180 may transfer that power to the ring gear 172 of the variator 170 in some embodiments. Like the embodiment discussed above, the power reverser 180 may have a forward mode for rotating the ring gear 172 in a first (forward) direction, and the power reverser 180 may have a reverse mode for rotating the ring gear 172 in a second (reverse) direction.

The powertrain 122 may further include a multi-speed device 140. Generally, the multi-speed device 140 may be disposed between the second electric machine 160 and the sun gear 174 of the variator 170. The multi-speed device 140 may have a plurality of speed modes for regulating the input and/or output speed of components of the second electric machine 160. Accordingly, as will be discussed, the speed range of the second electric machine 160 may be extended, and the second electric machine 160 may deliver power to the variator 170 across a wide range of speeds.

In some embodiments, the multi-speed device 140 may comprise a single planetary gearset, which includes a sun gear 142, a ring gear 144, and planet gears 146 with an associated carrier 148. However, it will be appreciated that the multi-speed device 140 may be configured differently. For example, instead of the planetary gearset shown, the multi-speed device 140 may include a parallel axis speed reducer in some embodiments.

The multi-speed device 140 may further include a first speed selector 147 and a second speed selector 149. The first and second speed selectors 147, 149 may be configured for selecting between the multiple speed modes as will be discussed.

The first speed selector 147 may be a brake having an engaged (braked) position and a disengaged (unbraked) position. In the engaged position, the first speed selector 147 may fix the ring gear 144 to the chassis 132 of the work vehicle. In the disengaged position, the first speed selector 147 may allow the ring gear 144 to rotate relative to the chassis 132.

Also, the second speed selector 149 may be a clutch with one or more first engagement members (e.g., friction plates, etc.) that are attached to the second e-machine shaft 161 and one or more second engagement members (e.g., friction plates, etc.) that are attached to the carrier 148. The second speed selector 149 may have an engaged and a disengaged position. In the engaged (clutched, activated) position, the sun gear 142, the planet gears 146, and the carrier 148 may be engaged to rotate together as a unit. In the disengaged position, the sun gear 142 may rotate relative to the planet gears 146 and the associated carrier 148.

The controller 220 may be in communication with the first and second speed selectors 147, 149 (as well as the second electric machine 160, the power reverser 180). Accordingly, the controller 220 may supply control signals to the first and second speed selectors 147, 149 for changing the mode of the multi-speed device 140.

In a first (low speed) mode, the first speed selector 147 may be in the engaged position while the second speed selector 149 is in the disengaged position. As such, power from the second electric machine 160 may transfer from the second e-machine shaft 161, to the planet gears 146 and carrier 148 to the sun gear 174 of the variator 170.

In a second (high speed) mode, the second speed selector 149 may be in the engaged position while the first speed selector 147 is in the disengaged position. As such, the sun gear 142, the planet gears 146, and the carrier 148 may be locked together and may be rotated as a unit by the second electric machine 160. This power may be transferred to the sun gear 174 of the variator 170.

Like the embodiments discussed above with respect to FIG. 2, the variator 170 may sum the power provided by the second electric machine 160 and the power reverser 180. The summed power may be delivered by the planet gears 176 and the carrier 178 to the output shaft 166. Ultimately, this power may be transferred by the downstream transmission 168 to the rear axle 128.

Accordingly, the multi-speed device 140 may provide discrete speed ratios for power inputs from the second electric machine 160 that feed the variator 170. This, in turn, may extend the useful range of the variator 170.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An infinitely variable transmission (IVT) for a work vehicle that includes an engine and an infinitely variable power (IVP) machine, the IVT comprising:
    an engine gear coupled to the engine;
    a variator with a first transmission component configured to receive engine power from the engine, a second transmission component configured to receive IVP power from the IVP machine, and an output transmission component configured to output summed engine power and IVP power; and
    a power reverser having a first gear enmeshed with a second gear and the engine gear to couple the engine to the first transmission component of the variator and transfer engine power from the engine to the first transmission component, the power reverser having a forward mode and a reverse mode;
    wherein the power reverser, in the forward mode, is configured to rotate the first transmission component in a forward direction; and
    wherein the power reverser, in the reverse mode, is configured to rotate the first transmission component in a reverse direction.

2. The IVT of claim 1, further comprising a multi-speed device that connects the IVP machine to the second transmission component of the variator;
    wherein the multi-speed device has a first speed mode and a second speed mode;
    wherein the multi-speed device, in the first speed mode, is configured to rotate the second transmission component within a first speed range; and
    wherein the multi-speed device, in the second speed mode, is configured to rotate the second transmission component within a second speed range.

3. The IVT of claim 2, wherein the multi-speed device includes a planetary gearset with a first planetary component, a second planetary component, and an output planetary component;
  wherein the multi-speed device includes a first speed selector and a second speed selector;
  wherein the first speed selector and the second speed selector each has an engaged position and a disengaged position;
  wherein the first speed selector, in the engaged position, engages the first planetary component and the second planetary component for rotation as a unit;
  wherein the first speed selector, in the disengaged position, disengages the first and second planetary components;
  wherein the second speed selector, in the engaged position, fixes the third planetary component against rotation relative to the first and second planetary components;
  wherein the second speed selector, in the disengaged position, releases the third planetary component for rotation relative to the first and second planetary components;
  wherein the first speed selector is in the engaged position and the second speed selector is in the disengaged position when the multi-speed device is in the first speed mode; and
  wherein the second speed selector is in the engaged position and the first speed selector is in the disengaged position when the multi-speed device is in the second speed mode.

4. The IVT of claim 1, wherein the first gear is configured to rotate a first intermediate gear;
  wherein the second gear is configured to rotate a second intermediate gear;
  wherein the first intermediate gear and the second intermediate gear are both enmeshed with a common gear; and
  wherein the common gear is configured to rotate the first transmission component of the variator in the forward mode and the reverse mode.

5. The IVT of claim 4, further comprising a first clutch having an engaged position and a disengaged position;
  further comprising a second clutch having an engaged position and a disengaged position;
  wherein the first clutch, in the engaged position, engages the first gear and the first intermediate gear for rotation as a unit;
  wherein the first clutch, in the disengaged position, disengages the first gear and the first intermediate gear;
  wherein the second clutch, in the engaged position, engages the second gear and the second intermediate gear for rotation as a unit;
  wherein the second clutch, in the disengaged position, disengages the second gear and the second intermediate gear;
  wherein the first clutch is in the engaged position and the second clutch is in the disengaged position when the power reverser is in the forward mode; and
  wherein the second clutch is in the engaged position and the first clutch is in the disengaged position when the power reverser is in the reverse mode.

6. The IVT of claim 5, wherein the engine gear is supported by an engine shaft of the engine.

7. The IVT of claim 1, wherein the variator is a planetary gearset;
  wherein the first transmission component of the variator is a ring gear of the planetary gearset;
  wherein the second transmission component of the variator is a sun gear of the planetary gearset; and
  wherein the output transmission component of the variator includes a planet gear and a carrier.

8. The IVT of claim 1, wherein the output transmission component is configured to provide summed power to a downstream transmission.

9. The IVT of claim 1, wherein the IVP machine is a first IVP machine; and
  further comprising a second IVP machine configured to receive engine power from the engine to generate power for the first IVP machine.

10. The IVT of claim 9, wherein the first IVP machine is a first electric machine; and
  wherein the second IVP machine is a second electric machine.

11. The IVT of claim 1, wherein power reverser provides a speed-up to the engine power that is provided to the variator.

12. A method of operating an infinitely variable transmission (IVT) of a work vehicle;
  providing IVP power from an infinitely variable power (IVP) machine to a first transmission component of a variator;
  providing engine power from an engine, through a power reverser, to a second transmission component of the variator;
  summing IVP power and engine power by an output transmission component of the variator; and
  changing the power reverser between a forward mode and a reverse mode, including:
    changing the power reverser from the forward mode to the reverse mode by engaging a first clutch of the power reverser and disengaging a second clutch of the power reverser; and
    changing the power reverser from the reverse mode to the forward mode by disengaging the first clutch and engaging the second clutch;
  wherein the power reverser, in the forward mode, rotates the second transmission component in a forward direction; and
  wherein the power reverser, in the reverse mode, is configured to rotate the second transmission component in a reverse direction.

13. The method of claim 12, further comprising:
  changing a multi-speed device that connects the IVP machine to the first transmission component of the variator between a first speed mode and a second speed mode;
  wherein the multi-speed device, in the first speed mode, is configured to rotate the second transmission component within a first speed range; and
  wherein the multi-speed device, in the second speed mode, is configured to rotate the second transmission component within a second speed range.

14. The method of claim 13, wherein the multi-speed device is a planetary gearset with a ring gear, a sun gear, and a planet gear;
  wherein changing the multi-speed device from the first speed mode to the second speed mode includes engaging the ring gear to a chassis of the work vehicle and allowing relative rotation between the sun gear and the planet gear; and wherein changing the multi-speed device from the second speed mode to the first speed mode includes disengaging the ring gear from the chassis and engaging the sun gear and the planet gear.

15. The method of claim 12, wherein the IVP machine is a first IVP machine;
further comprising providing engine power to a second IVP machine for generating power for the first IVP machine.

16. The method of claim 15, further comprising generating electric power by the second IVP machine; and
providing the electric power from the second IVP machine to the first IVP machine.

17. The method of claim 12, further comprising providing, by the power reverser, a speed-up to the engine power that is provided to the variator.

18. A work vehicle comprising:
an engine with an engine gear;
an electric machine;
a variator with a planetary gearset having a first gear, a second gear, and an output gear, the first gear configured to receive engine power from the engine, the second gear configured to receive e-power power from the electric machine, and the output gear configured to output summed engine power and e-power; and
a power reverser having two gears enmeshed with one another and one of the gears enmeshed with the engine gear to couple the engine to the first gear of the planetary gearset and transfer engine power from the engine to the first gear, the power reverser having a forward mode and a reverse mode;
wherein the power reverser, in the forward mode, is configured to rotate the first gear in a forward direction; and
wherein the power reverser, in the reverse mode, is configured to rotate the first gear in a reverse direction.

\* \* \* \* \*

UNITED STATES PATENT AND TRADEMARK OFFICE
CERTIFICATE OF CORRECTION

PATENT NO. : 10,619,711 B2
APPLICATION NO. : 15/485911
DATED : April 14, 2020
INVENTOR(S) : Fliearman et al.

Page 1 of 1

It is certified that error appears in the above-identified patent and that said Letters Patent is hereby corrected as shown below:

On the Title Page

On Page 3, Column 1, In Item (56), under "OTHER PUBLICATIONS", Line 25, delete "fer" and insert -- for --, therefor.

In the Claims

In Column 11, Claim 3, Line 3, delete "component," and insert -- component, a third planetary component, --, therefor.

In Column 12, Claim 11, Line 20, delete "power reverser" and insert -- the power reverser --, therefor.

Signed and Sealed this
Fourth Day of August, 2020

Andrei Iancu
*Director of the United States Patent and Trademark Office*